United States Patent

Koennecke et al.

[15] 3,642,158
[45] Feb. 15, 1972

[54] TURNAROUND DEVICE FOR A PALLET CONVEYOR

[72] Inventors: Wolfgang Koennecke, Bad Homburg; Reinhold Stricker, Frankfurt am Main, both of Germany

[73] Assignee: Flughafen Frankfurt am Main Aktiengesellschaft, Frankfurt am Main, Germany

[22] Filed: Aug. 22, 1969

[21] Appl. No.: 852,183

[30] Foreign Application Priority Data

Aug. 23, 1968 Germany.....................P 17 81 097.8

[52] U.S. Cl..................................214/314, 198/21, 198/85, 214/301
[51] Int. Cl.......................................B65g 47/38, B65g 47/42
[58] Field of Search..........................198/21, 27, 85, 127, 181; 214/318, 16.1 CD, 301, 312, 314

[56] References Cited

UNITED STATES PATENTS

| | | | |
|---|---|---|---|
| 1,295,195 | 2/1919 | Parker | 198/21 |
| 2,062,604 | 12/1936 | Paxton | 198/21 X |
| 2,295,526 | 9/1942 | Bee et al. | 198/21 |
| 2,341,642 | 2/1944 | Mikaelson | 198/27 |
| 2,613,798 | 10/1952 | McPhee | 198/21 |
| 2,868,349 | 1/1959 | Edmonds et al. | 198/21 |
| 3,173,554 | 3/1965 | Ebbert | 198/27 X |
| 1,738,039 | 12/1929 | Cope et al. | 214/16.1 CD |
| 3,123,232 | 3/1964 | Postlewaite | 214/301 |

FOREIGN PATENTS OR APPLICATIONS

| | | | |
|---|---|---|---|
| 1,097,401 | 1/1961 | Germany | 214/301 |

*Primary Examiner*—Evon C. Blunk
*Assistant Examiner*—W. Scott Carson
*Attorney*—Christen & Sabol

[57] ABSTRACT

A pallet conveyor system having individual pallets supported and moved on a series of wheels rotating on horizontally spaced fixed axes includes a turnaround mechanism wherein a set of supporting wheels are mounted at right angles and are capable of being raised above the level of the first set of wheels to change the direction of movement of a pallet at that point.

8 Claims, 7 Drawing Figures

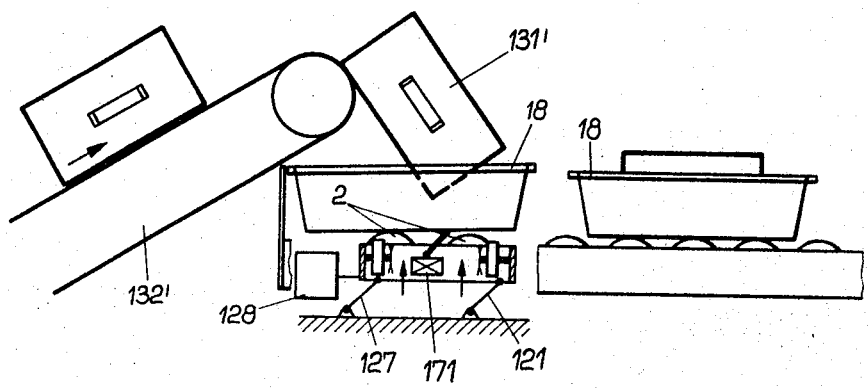
Fig. 3
Fig. 4
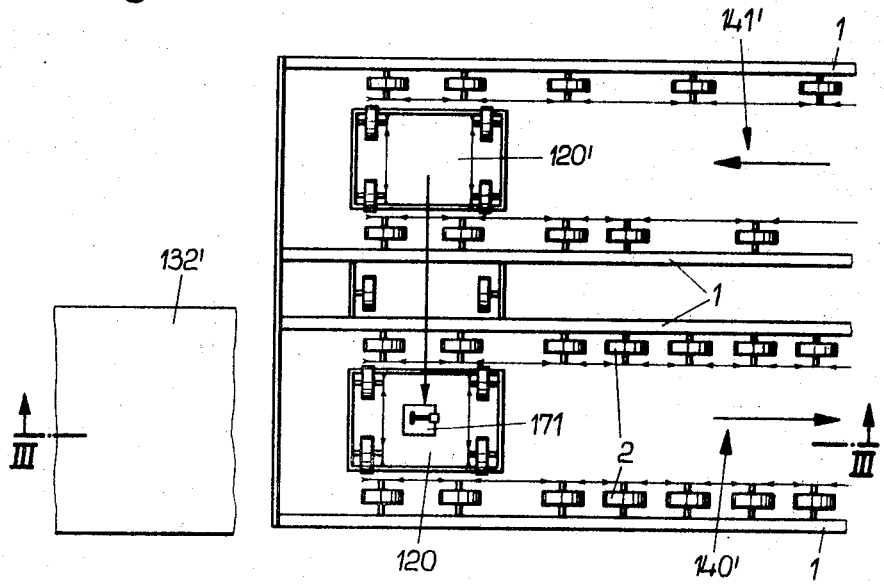

TURNAROUND DEVICE FOR A PALLET CONVEYOR

The invention relates to a turnaround device for a conveyor for pallets which may be trough-shaped and which are conveyed over drive wheels mounted on support rails as described for example in our copending Pat. application No. 844,795, filed Aug. 22, 1969.

The beginning and end of such a conveyor are in the form of so-called loading and unloading stations combined with turnaround devices. Here the material to be loaded or unloaded, for example luggage, has to be placed in or taken out of the pallets. At the loading and unloading stations only a minimum of space is available for despatching the emptied pallets and bringing in those required for loading.

Such turnaround devices must be designed for either fully automatic or manual handling of the luggage. In addition, the turnaround devices and also the loading and unloading mechanisms must provide an opportunity for luggage which has been sent in in error or which has to be rearranged, to be forwarded to other loading or unloading stations.

The turnaround device according to the invention comprises a vertically adjustable transfer assembly provided in the region of the turnaround device between the support rails, to move the pallets substantially at right angles from a first conveyor track to a second conveyor track.

With the turnaround device according to the invention, pallets approaching along a conveyor track can—once they have arrived at the turnaround device—be lifted off the drive wheels belonging to the conveyor and be guided onto an adjoining conveyor at right angles to the first. The pallets are thus turned around in a minimum of space.

The invention further provides for another, similar transfer assembly to be provided adjacent the first transfer assembly, in a conveyor track substantially parallel to the first conveyor track.

In this way pallets, either loaded or empty, may be returned along a second conveyor parallel with the first. The second conveyor may be immediately adjacent the first, since the two transfer assemblies are each arranged between the support rails of the respective conveyor. But it is also possible for parallel conveyors spaced some distance apart to be linked in this way. In such a case, two support rails fitted with drive wheels would have to be provided between the two transfer assemblies.

As a development of the basic idea of the invention, the turnaround device may very simply be modified to form a loading station for the luggage to be carried by the conveyor.

A loading station may be constructed if the discharging end of a conveyor belt and a switch, which causes the transfer assembly to be lowered to the level of the conveyor track during the loading of the pallet, are provided above one of the two transfer assemblies.

In a preferred unloading station for the pallets, the intake end of a conveyor belt and a fork, which engages the approaching pallets and is adapted to pivot about a shaft at right angles to the conveyor track, are provided in the region of one of the two transfer assemblies.

If, as will usually be the case, the conveyor track is continued after the unloading station, then the prong of the fork facing in the direction in which the pallets are removed is adapted to swing out in this direction.

Embodiments of the invention will now be described by way of example with reference to the accompanying drawings in which:

FIG. 3 is a fragmentary side view of a turnaround device according to the invention taken on the line III—III of FIG. 4, the device being located at a loading station;

FIG. 4 shows the device of FIG. 3 in plan;

Figure 2:
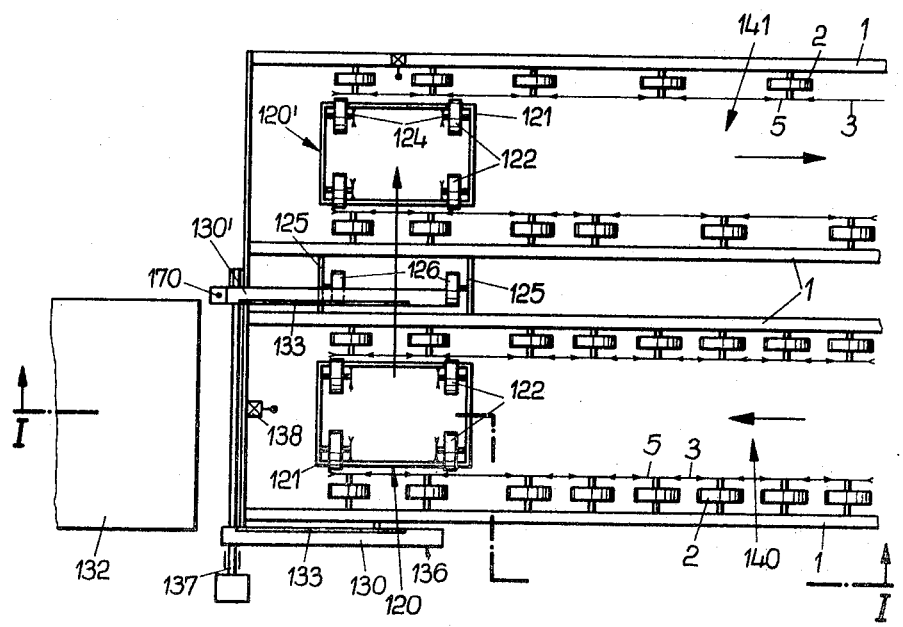
FIG. 2 shows device of FIG. 1 in plan.

Referring now to FIG. 2, two parallel conveyors are provided, with support rails 1 and drive wheels 2 arranged thereon. The drive wheels are rotated by means of V-belts 3 passing over pulleys 5. A transfer assembly 120 is provided at one end of each of the two conveyors, between the two support rails and the drive wheels arranged thereon. The transfer assemblies 120, 120' substantially consist of a rectangular frame 121, on which drive wheels 122 are provided at right angles to the wheels 2 of the conveyors. Like the wheels 2, the wheels 122 are driven by means of V-belts 123 and pulleys 124. The drive motor is not illustrated. The two conveyors, which run parallel as shown in FIG. 2, are linked in the region of the drives 120 by connecting rails 125, on each of which rails a support wheel 126 is mounted. In the example illustrated the wheels 126 are not driven, but if the connecting line 125 were to be longer, the wheels 126 could be driven like those of the conveyors.

Figure 1:
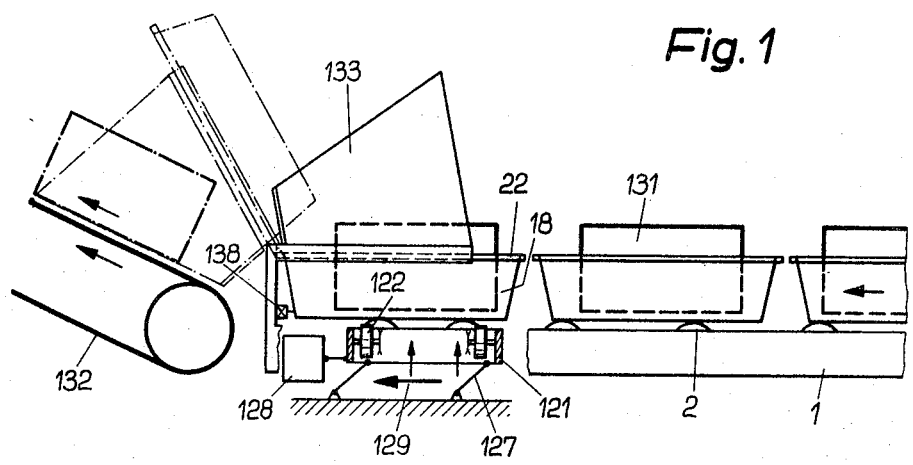
FIG. 1 is a side sectional view of turnaround device according to the invention taken on the line I—I of FIG. 2, the device being located at an unloading station.

As will be seen from FIG. 1, the frame 121 is carried by pivoted levers 127 which are pivotally mounted at fixed points at their lower ends to form a parallelogram linkage. In order to bring the wheels 122 of the transfer assembly 120 into engagement with the bottom of pallets 18, the frame 121 is moved in the direction of the arrow 129 by means of an electromagnet 128. The frame 121 is thereby raised because the levers 127 were previously arranged obliquely in the inoperative position of the transfer assembly 120. The transfer assembly 120 may alternatively be moved into engagement with the bottoms of the pallets 18 by hydraulic or pneumatic means.

As soon as the transfer assembly 120 engages the bottom of a pallet 18 as described above, the pallet is driven by means of the revolving drive wheels 122—in the example illustrated at right angles to its previous direction of movement along the conveyor 140—and is moved over the support wheels 126 at the same level as the drive wheels 122 and onto the other transfer assembly 120' belonging to the conveyor 141.

The upward and downward movement of the transfer assembly 120 belonging to the conveyor 140 is controlled by means of a contact switch 138, which is operated by abutment with the pallets 18 to be transferred. A contact switch 139 is similarly provided to control the movement of the transfer assembly 120' associated with the conveyor 141. When the pallet 18 coming from the conveyor 140 strikes the contact switch 139, the transfer assembly 120' (associated with the conveyor 141)—which is initially raised to the same level as the transfer assembly 120 associated with the conveyor 140— is lowered below the level of the drive wheels of the conveyor 141, so that the pallets 18 are placed on the said drive wheels 2 of the conveyor 141. They are then carried away in the opposite direction to that of their approach along the conveyor 140.

As shown in FIGS. 1 and 2, the turnaround device described above is also designed as an automatic unloading station for the laden pallets approaching it. For this purpose, a conveyor belt 132 is available adjoining the conveyor 140. At the end of the conveyor 140, there is also a fork 136, the prongs 130, 130' of which extend parallel to the support rails 1 and are arranged to pivot about a shaft 137 at right angles to the rails 1. The prongs 130, 130' are U-shaped in cross section and are arranged so that one rim 22 of the approaching pallets 18 is inserted into each of them. The switch 138 may be designed so that when the pallet 18 reaches its final position in the prongs 130, 130' of the fork 136, it causes the fork 136 to pivot through about 120° to drop the contents of a pallet on the conveyor while the pallet itself is retained by the prongs and returned to the turnaround device. This operation is shown in broken lines in FIG. 1. In order to prevent any pieces of luggage 131 from slipping off sideways during the pivoting movement, each of the prongs 130, 130' of the fork 136 is provided with a guide plate 133. The inclination of the conveyor belt 132, shown in FIG. 1, reduces the distance through which the luggage has to drop.

The prong 130' of the fork 136 is arranged to pivot about a shaft 170—which is vertical when the fork is horizontal—into the direction of the shaft 137. This pivoting movement takes place when a pallet 18 has to be moved from the transfer assembly 120 of the conveyor 140 towards the transfer assembly 120' of the conveyor 141.

The prong 130' is supported at one end on a vertical shaft 170 so that it can be deflected by the departing pallet 18 and returned to its FIG. 2 position by a spring (not shown) mounted on the shaft 170.

An automatic loading station for the pallets 18 is illustrated in FIGS. 3 and 4. In FIG. 4 the conveying arrangements for the pallets is the reverse of that shown in FIG. 2, although the operation of the turnaround device with the transfer assemblies 120, 120' is substantially the same. As shown in FIG. 3, the pieces of luggage 131 are fed by a conveyor belt 132' to pallets standing on a transfer assembly 120. The conveyor belt 132' is arranged so that the pieces of luggage 131' to be fed to the pallets 18 will first drop into the part of the pallets 18 opposite the belt. When the pallet 18 is thus loaded, a feeler switch 171 in its base is operated, and causes the transfer assembly 120 of the conveyor 141 to drop below the level of its drive wheels 2, so that the pallet 18 is taken away.

Figure 5:
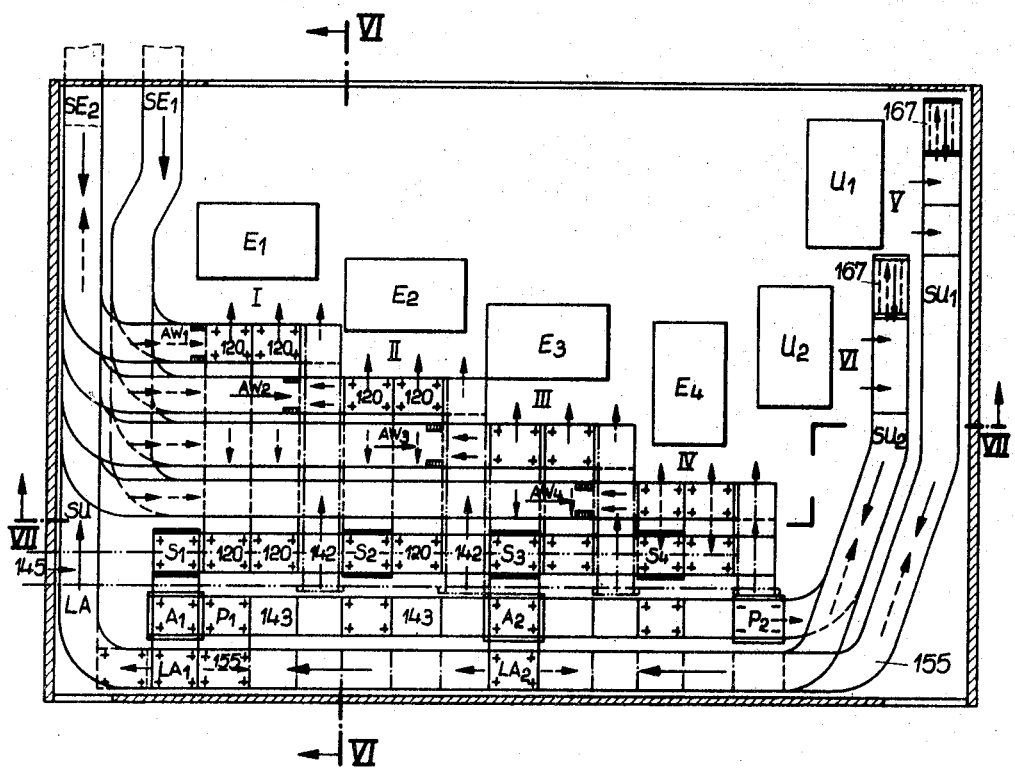
FIG. 5 is a plan view of a number of turn around devices located at a large size container loading station.
Figure 7:
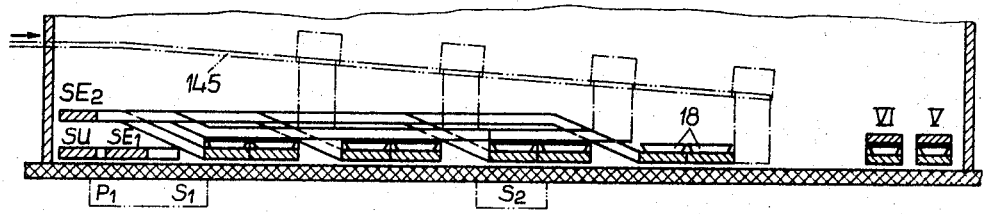
FIG. 7 is a section taken along the line VII—VII of FIG. 5.
Figure 6:
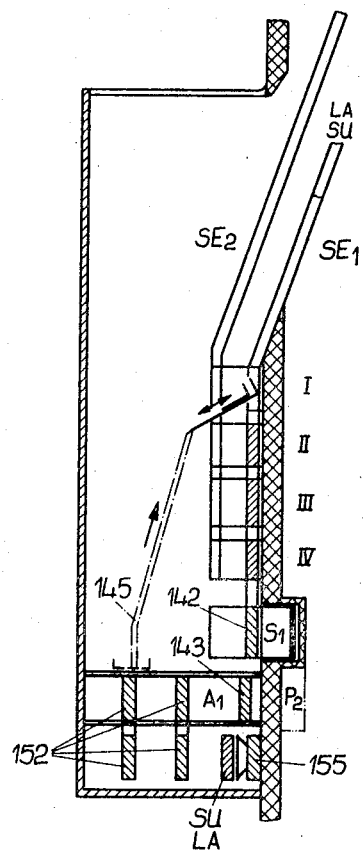
FIG. 6 is a section taken along the line VI—VI of FIG. 5.

A large scale loading station made up of the components in FIGS. 1 to 4, is illustrated in FIGS. 5 to 7. Here the pieces of luggage brought by pallets along conveyor tracks $SE_1$ and $SE_2$ are to be transferred manually to containers $E_1$ to $E_4$. More luggage is to be taken by hand from containers $U_1$ and $U_2$ and placed on pallets 18 on tracks $SU_1$ and $SU_2$. In addition, luggage approaching along conveyor belts 145 is to be transferred to the containers $E_1$ to $E_4$. The pieces of luggage approaching along tracks $SE_1$ and $SE_2$ may be diverted onto branch lines $AW_1$ to $AW_4$ as desired according to their destination. The operation of the station will be explained by reference to the branch line $AW_2$. As mentioned above, pallets diverted onto this line are manually unloaded at the point II. The pallets stand on transfer assemblies in accordance with FIGS. 3 and 4, two such transfer assemblies 120 being juxtaposed. When the luggage has been removed the pallets are sent along branch lines $AW_3$ and $AW_4$ to a stacking line 142, as explained in connection with FIGS. 1 to 4. The stacking line 142 is virtually made up of a number of transfer assemblies 120; the empty pallets are conveyed along it to stackers $S_1$ to $S_4$, where they are piled up. The stacks are then sent, again via transfer assemblies 120, to lifts $A_1$ and $A_2$, whence they are conveyed to standby lines 152, provided for the stacked pallets. Another possibility is for some of the stacked pallets to be diverted onto exit lines LA and returned to the actual conveyor track.

The stacks of pallets standing on the lines 152 are removed as required and, after passing through two unstacking devices $P_1$, $P_2$, sent along the track 143, 155 and up elevators 167 to the loading stations V and VI, in front of the containers $U_1$ and $U_2$. From there they pass along the lines $SU_1$ and $SU_2$ into the actual conveyor track.

I claim:

1. In a turnaround mechanism for article handling systems of the type wherein said articles are carried by a plurality of pallets and the pallets are individually moved by a series of drive wheels mounted on horizontal axes spaced along the length of a trackway for guiding the pallets, the improvement which comprises an article handling mechanism arranged adjacent a specified location in said trackway for transferring said articles between a pallet at said location and said article handling mechanism, said article handling mechanism including fork means including a pair of horizontally spaced prongs for securing a pallet approaching said fork means when the prongs are horizontally disposed, said trackway including a transfer assembly at said specified location in the trackway, said transfer assembly including two sets of drive wheels arranged at right angles to each other, each of said sets including at least two pairs of drive wheels mounted on horizontal spaced axes, one of said sets being in alignment with the drive wheels of the trackway, and means for shifting the relative vertical position of one of said sets of drive wheels with respect to the other set whereby a pallet may be moved horizontally in either of two directions into and out of position for said transferring of articles between the article handling mechanism and an individual pallet by selective relative vertical positioning of said one set of drive wheels and switch means responsive to the presence of a pallet for raising and lowering said one set of drive wheels.

2. The invention defined in claim 1, wherein said pallet conveyor system includes two trackways and another said transfer assembly is located in the other of said trackways and includes means for transferring a pallet at right angles from said one trackway to the other of said two trackways.

3. The invention defined in claim 2, wherein said two trackways are arranged parallel to each other, and the other of the two trackways includes a transfer assembly disposed adjacent the first mentioned transfer assembly.

4. The invention defined in claim 2, wherein said article handling mechanism includes conveyor means for discharging articles to a pallet located at said transfer assembly, and said transfer assembly includes switch means responsive to loading of said articles on said pallet to actuate said means for subsequent movement.

5. The invention defined in claim 1, wherein said transfer assembly includes a substantially rectangular frame means, said frame means including drive wheels arranged on said frame means for rotation about parallel horizontal axes.

6. The invention defined in claim 5, wherein said transfer assembly includes vertically displaceable support means for said frame means.

7. The invention defined in claim 6, wherein said support means includes a plurality of levers extending between said frame means and a fixed base, each of said levers being pivotally connected at their opposite ends respectively to the base and the frame means and being arranged in parallel relationship.

8. The invention defined in claim 5, wherein one of said pair of horizontally spaced prongs is mounted for rotation about a vertical axis in addition to said rotation about a horizontal axis to allow movement of a pallet away from said fork means in a lateral direction.

* * * * *